United States Patent [19]

Chapman

[11] 3,872,983
[45] Mar. 25, 1975

[54] FREIGHT CARRYING DEVICE
[75] Inventor: Harvey W. Chapman, Detroit, Mich.
[73] Assignee: Evans Products Company, Plymouth, Mich.
[22] Filed: Apr. 20, 1970
[21] Appl. No.: 29,866

[52] U.S. Cl............ 214/38 R, 105/368 R, 214/505, 292/36
[51] Int. Cl...................... B65g 67/02, B61d 47/00
[58] Field of Search.......... 214/38 CC, 41, 44, 505; 105/367 R, 368 R; 296/1 A; 49/37, 70; 292/36

[56] References Cited
UNITED STATES PATENTS
| | | | |
|---|---|---|---|
| 2,996,020 | 8/1961 | Udstad | 105/367 |
| 3,014,604 | 12/1961 | Loomis | 214/38 CC |
| 3,182,610 | 5/1965 | Jones | 105/368 R |
| 3,613,914 | 10/1971 | Jaekle et al. | 214/38 R |

OTHER PUBLICATIONS
Southern Pacific Bulletin, July 1969.

Primary Examiner—Robert G. Sheridan
Attorney, Agent, or Firm—Harness, Dickey & Pierce

[57] ABSTRACT

A freight carrying railway car embodying a plurality of doors mounted for pivotal movement about a horizontally disposed axis from an open, loading position to a closed, cargo carrying position. In the open position, the doors serve as ramps onto which one or more motor vehicles may be driven. As the doors are pivoted to their closed position the motor vehicles become suspended upon the doors. A locking arrangement is provided at the top and sides of the doors for insuring that they are locked. Two different types of hold-downs are disclosed for holding the motor vehicles in position upon the closed doors. One of these hold-downs is manually operated and is disposed so that the doors cannot be closed unless the hold-down is in its locked position. The other embodiment of hold-down is automatically movable to its locked position when the door is closed.

15 Claims, 10 Drawing Figures

INVENTOR.
Harvey W. Chapman

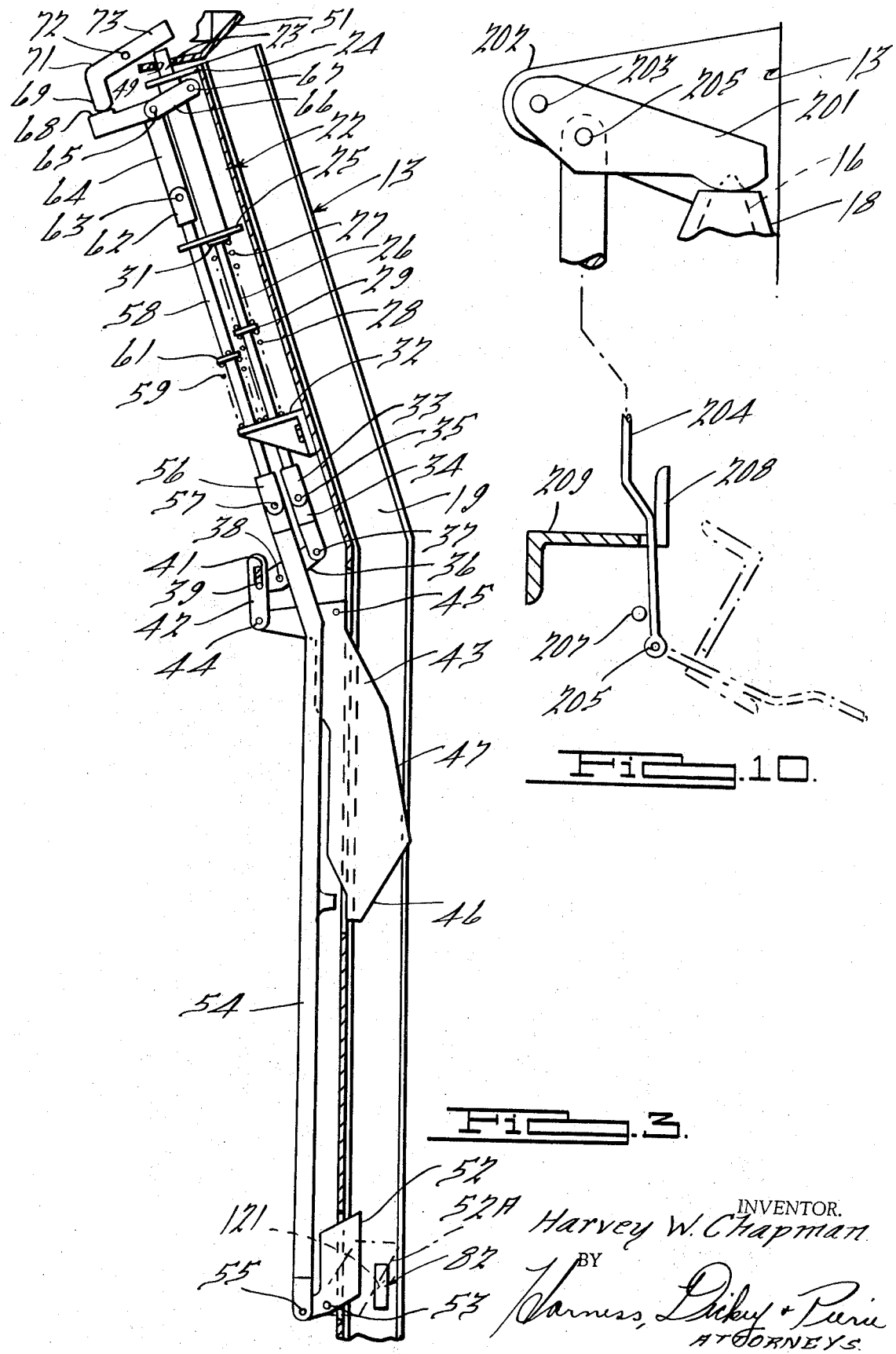

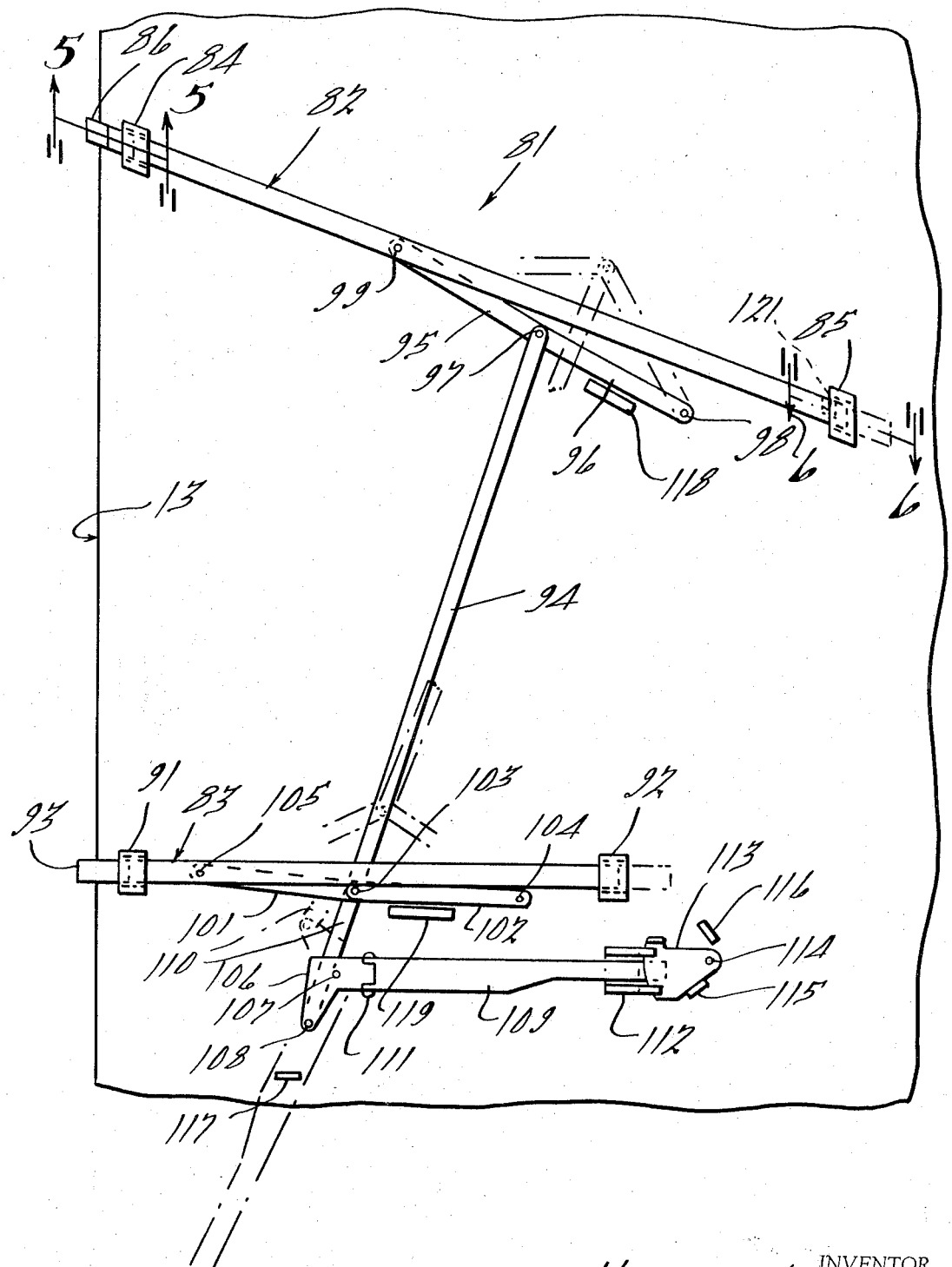

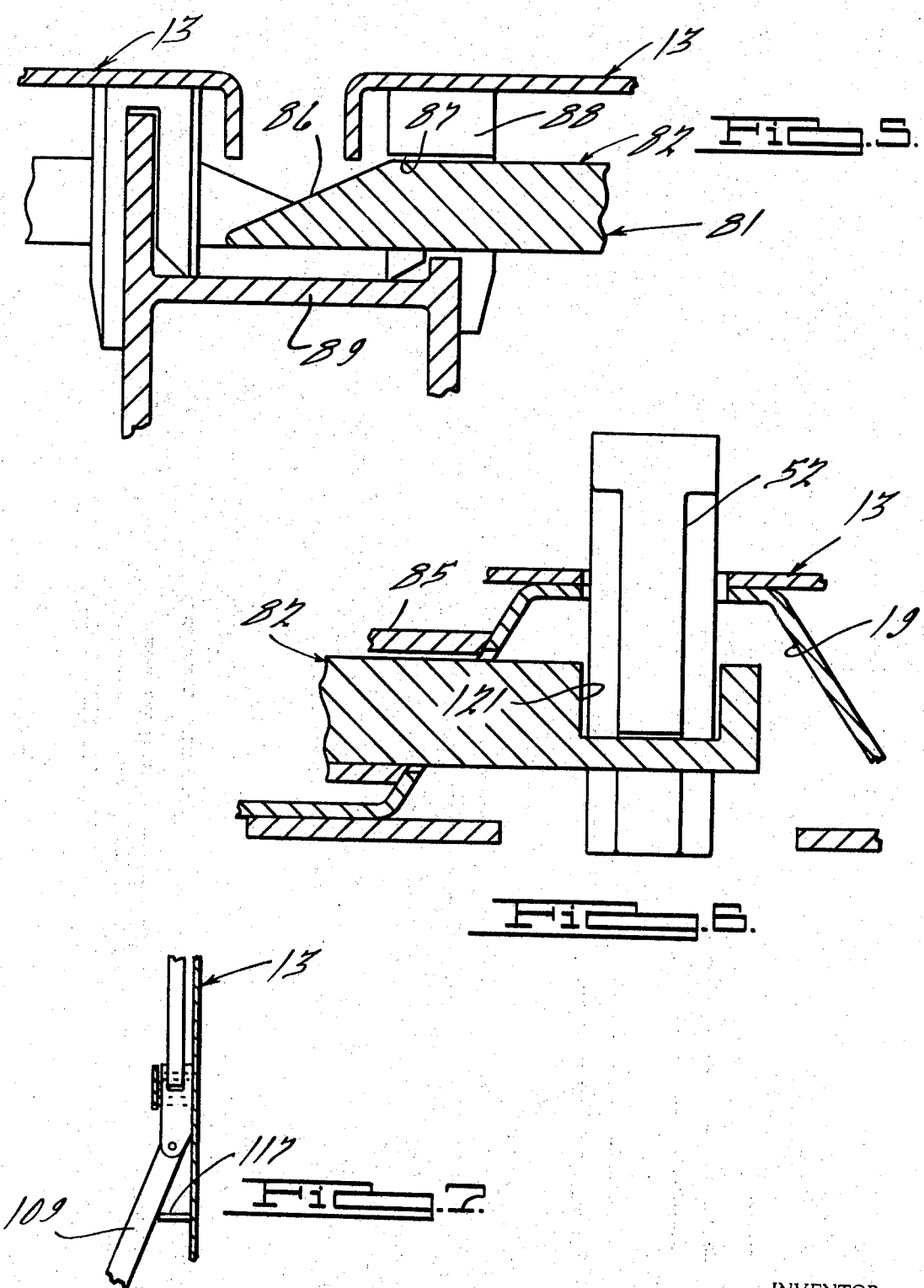

3,872,983

FREIGHT CARRYING DEVICE

BACKGROUND OF THE INVENTION

This invention relates to a freight carrying device and more particularly to an improved arrangement for facilitating the shipment of motor vehicles.

Various modes of shipping motor vehicles between their assembly point and the point of consumer sale have been proposed. One of the more commonly used types of vehicle transportation is the haulaway railroad car. These cars carry three levels of motor vehicles from the factory to the sales point. The vehicles must be driven onto the cars by means of a ramp arrangement and the cars are open-sided so that the vehicles are subject to damage by the elements and by vandals during shipment. Recently a system has been proposed for shipping motor vehicles on a railroad car that has a plurality of ramp-like doors that are pivotal about a horizontally disposed axis from an open position in which they form ramps onto which the motor vehicles may be driven and a closed position in which the motor vehicles are supported in a generally vertical orientation. In the closed position, the doors form a complete closure for the car, thus protecting the vehicles from damage. This method of shipping also permits the carrying of a greater number of motor vehicles per freight car. This, of course, reduces shipping costs.

Since the motor vehicles are supported on the doors in a vertical orientation and more than one vehicle may be supported on a single door it is imperative that a secure and foolproof locking arrangement be provided to insure against accidental opening of the doors during transit. Specficially, it is important to provide means for insuring that the doors of the railroad car are locked before it is placed in transit.

It is, therefore a principal object of this invention to provide an improved locking element for a car carrying device.

It is another object of the invention to provide a locking system for a cargo carrying device that cannot be accidentally left unlocked.

It is a further object of the invention to provide an improved method of shipping motor vehicles.

The shipment of motor vehicles always requires a secure hold-down for insuring against damage to the vehicle during transit. This is equally important when the vehicle is to be shipped in a vertical orientation by the aforedescribed method.

It is, therefore, another principal object of this invention to provide an improved hold-down for a load carrying device.

It is yet a further object of the invention to provide a hold-down for a load carrying device that cannot be accidently left unlocked.

It is a still further object of the invention to provide a hold-down for a motor vehicle shipping device embodying a pivotally supported door on which the motor vehicle is supported, which hold-down automatically locks when the door is pivoted to its closed position.

SUMMARY OF THE INVENTION

A first feature of the invention is adapted to be embodied in a freight carrying device comprising a load carrying member adapted to support a load. Means support the load carrying member for movement between a loading position and a load supporting position. First latching means are provided for latching a load carrying member in the load supporting position. The first latching means is movable between a latching position and a release position and means in the load carrying member define a channel that is adapted to receive an operator for moving the first latching means between these positions. A second latching means is also provided for locking the load carrying member in its load supporting position. This second latching means is also movable between a latching position and a release position and means are provided for moving the second latching means between these positions. Means are provided precluding movement of the operator from the channel until both of the latching means are in their latching positions.

A further feature of this invention is adapted to be embodied in a closure construction that includes a closure member supported for pivotal movement about a pivot axis between an opened position and a closed position. First latching means at the edge of the closure member remote from its pivot axis are movable between a latching position for holding the closure member in its closed position and a released position. Second latching means are supported at an edge of the closure member that is angularly disposed relative to the first mentioned edge and are also movable between a latching position for holding the closure member in its closed position and a released position. Means define an opening in the closure member for receiving an operator for moving one of the latching means between its positions. Means are provided for moving other of the latching means between its positions. Means are provided to preclude removal of the operator from the opening until the other latching means is in its latched position for insuring against the leaving of the closure member in a closed but unlatched condition.

Yet another feature of the invention is adapted to be embodied in a freight carrying device that is comprised of a load carrying member movable between a loading position and a load carrying position. Locking means are carried by the load carrying member for affixing a cargo to the load carrying member. The locking means is movable between an opened position in which cargo may be removed from or placed upon the load carrying member and a locked position in which cargo is affixed relative to the load carrying member. Means preclude movement of the load carrying member into the load carrying position until the locking means is in its locking position for insuring against movement of the load carrying member into its load carrying position until the cargo is locked thereupon.

A still further feature of the invention is also adapted to be embodied in a freight carrying device comprising a load carrying member movable between a loading position and a load carrying position. As with the feature described in the preceding paragraph, locking means are provided for affixing a cargo to a load carrying member. In connection with this feature, means are provided for automatically moving the locking means from its opened position to its locked position in response to movement of the load carrying member from its loading position to its load carrying position.

BRIEF DESCRIPTION OF THE DRAWINGS

FIG. 3 is an enlarged cross-sectional view taken generally in the same plane as FIG. 2 and shows the upper portion of the door and car structure.

FIG. 4 is an elevational view of somewhat schematic form showing the side locking mechanism of the door.

FIG. 5 is an enlarged cross-sectional view taken along the line 5—5 of FIG. 4.

FIG. 6 is an enlarged cross-sectional view taken generally along line 6—6 of FIG. 4 with the mechanism in a released position.

FIG. 7 is a side elevational view showing the handle mechanism for the side locks in a released position.

FIG. 10 is an enlarged cross-sectional view showing an automatic hold-down mechanism.

DETAILED DESCRIPTION OF THE PREFERRED EMBODIMENTS

Figure 1:
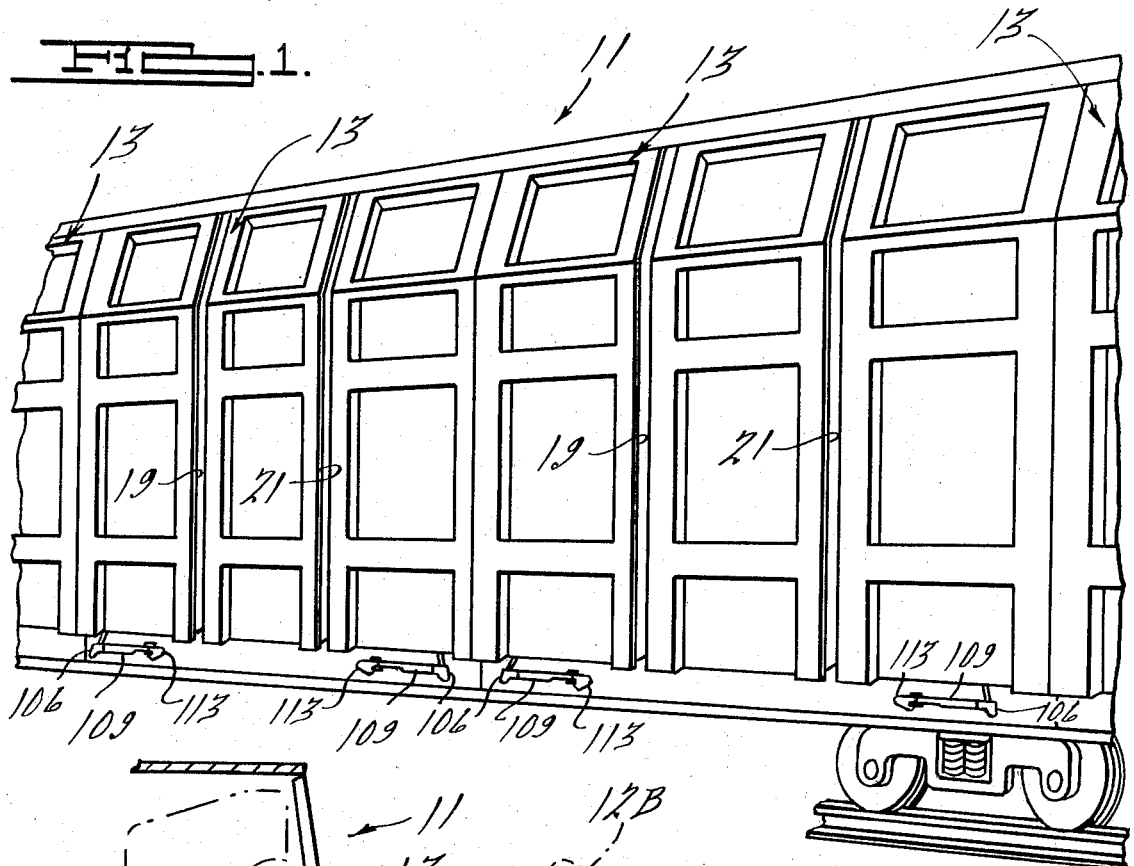
FIG. 1 is a prospective view of a portion of a railroad car embodying the several features of this invention.
Figure 2:
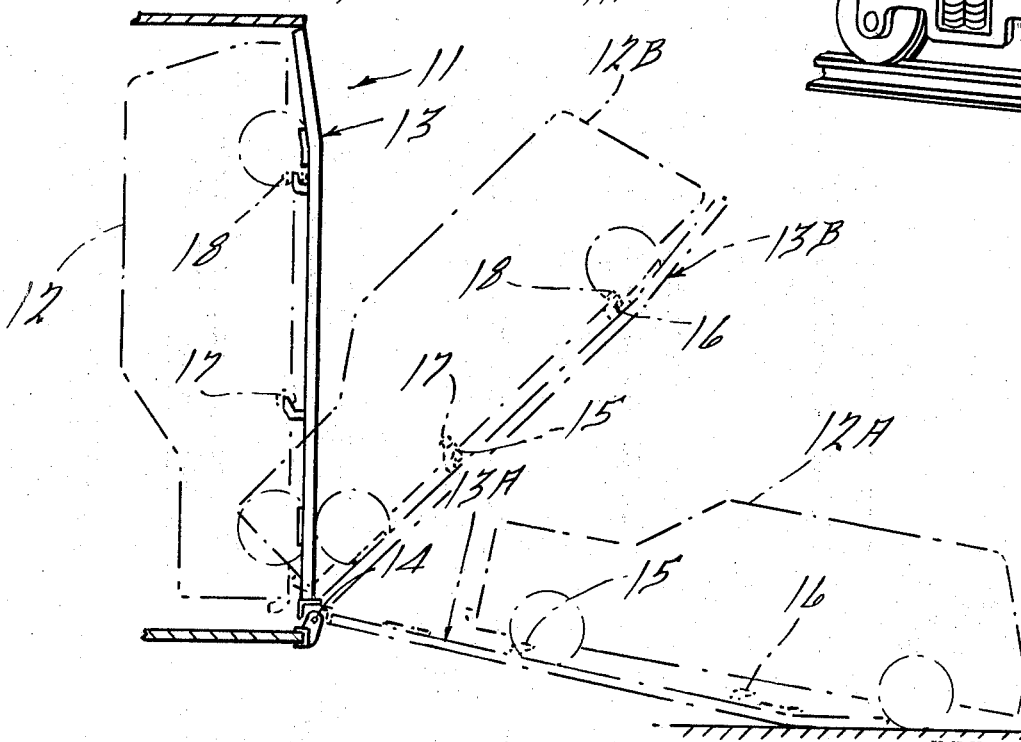
FIG. 2 is a vertical cross-sectional view of the car of FIG. 1 and shows the load carrying doors in three positions.

Referring first to FIGS. 1 and 2, a railroad car embodying this invention is identified generally by the reference numeral 11. The car 11 is particularly adapted to carry motor vehicles, shown in phantom in several of the views and identified by the reference numeral 12, from their assembly point to a sales distribution point. The car 11 is especially constructed for this purpose and includes opposite sides made up of a plurality of load carrying doors or side walls, indicated generally by the reference numeral 13. The doors 13 are each pivotally mounted on the car underframe structure by means of hinges 14 that define a horizontal pivot axis for the doors 13. When the doors 13 are in their closed position, they form a continually extending side wall for the car 11 and completely enclose the transported motor vehicles 12 within the car 11.

This invention relates to a locking structure for holding the doors 13 in their closed positions and two embodiments of hold-down devices for holding the motor vehicles 12 on the doors 13 during transit. For this reason, a detailed description of the structure of the car 11 and the doors 13 will not be given. It is to be understood, however, that certain features of the invention may be used in other environments.

The doors 13 are movable about the hinges 14 from a loading position, as indicated by the phantom line view 13-A in FIG. 2 through an intermediate position indicated by the phantom line view 13-B to the closed position indicated by the solid line view in this figure. In the open or loading position of the doors 13-A, one or more vehicles 12 may be driven onto each load carrying door 13. In the depicted embodiment, three motor vehicles are adapted to be suspended on each of the doors 13. Pairs of hooks 15 and 16 are mounted on the inner surface of the doors 13-A and are positioned to be received in suitable apertures formed in brackets 17 and 18, respectively, that are affixed to the underframe or form a portion of the frame of the motor vehicles 12. When the hooks 15 and 16 are received in the apertures of the brackets 17 and 18, the forward motion of the motor vehicle 12 will be stopped indicating that the vehicle 12 has been driven sufficiently far onto the door 13. After the desired number of motor vehicles 12 have been driven onto each of the doors 13, the doors 13 are closed by inserting specially formed, generally T-shaped forks of a fork lift truck or comparable elements of a crane into fork receiving channels 19 and 21 in the outer face of each of the doors 13. After the forks are pivoted in the upper extremity of the channels 19 and 21, the fork lift truck is driven toward the car 11 and the forks are raised relative to the horizontal and lowered relative to the top edge of the doors 13. The doors 13 thus will be pivoted about the hinges 14 toward their closed positions through the phantom line view 13-B of FIG. 2. This action is continued until the doors 13 are fully closed. At this time, the weight of the motor vehicle 12 on the hooks 15 and 16 may be sufficient to preclude disengagement during transit. If desired, and as will become more apparent as this description proceeds, a more positive cargo hold-down may be provided for insuring against displacement of the vehicles 12 during transit.

A locking mechanism, now to be described by reference to FIGS. 3 through 7, is provided for retaining the doors 13 in their closed positions. This locking mechanism insures that the doors 13 will be securely locked and will preclude removal of the forks of the truck from the channels 19 and 21 until the doors are locked in their closed position.

The door locking structure includes a top latching mechanism, indicated generally by the reference numeral 22. There are two such top latching mechanisms 22 associated with each door 13. One top latching mechanism 22 is juxtaposed to each of the fork receiving channels 19 and 21, and since these mechanisms are identified, only the one associated with channel 19 will be described in detail by particular reference to FIG. 3. The latching mechanism 22 includes a latching pin 23 that is slidably supported in a pair of spaced plates 24 and 25 that are affixed in any suitable manner to the door 13 adjacent the channel 19. The pin 23 has an extension 26 that is encircled by a pair of coil springs 27 and 28. A collar 29 is slidably supported on the projection 26 and is engaged by adjacent ends of the springs 27 and 28. The spring 27 bears against a shoulder 31 formed at the upper end of the extension 26 and the spring 28 bears against the bracket 32 that is affixed in any suitable manner to the door 13. The springs 27 and 28 exert an upward bias upon the latching pin 23 for moving this pin to its latching position, as will become more apparent as this description proceeds.

The lower end of the extension 26 is connected to a trunnion 33 which is, in turn, pivotally connected to a short connecting link 34 by means of the pivot pin 35. The other end of the connecting link 34 is pivotally connected at one arm of a bell crank 36 by means of a pivot pin 37. The bell crank 36 is pivotally supported on the door 13 by means of a pivot pin 38 that is affixed to any suitable door supported bracket (not shown).

A pin 39 is affixed to the other end of the bell crank 36 and is received in an elongated slot 41 in a link 42. This arrangement provides a lost motion connection between the link 42 and the bell crank 36. The link 42 is pivoted to an actuating lever 43 by means of the pivot pin 44. The actuating lever 43 is pivotally supported upon the door 13 by a pivot pin 45 that is affixed to a bracket (not shown). The actuating lever 43 has a pair of oppositely inclined cam surfaces 46 and 47 that are disposed within the channel 19 so as to be engageable by the forks of the lift truck. When a fork is present in the channel 19 below the cam surface 46 and is raised into engagement with the lever 43 and particularly its surface 46, the operating lever 43 will pivot in a clockwise direction about the pivot pin 45. The link 42 will then be driven upwardly and transmit this motion to the pivot pin 39 to rotate the bell crank 36 in a clockwise direction. This clockwise rotation will pull the latching pin extension 26 and latch pin 23 downwardly to free the latter from an opening 49 formed in the car roof structure 51. The top latching structure 22 is then fully released.

A safety mechanism is incorporated to insure that the door 13 cannot be left in a partially closed position without the top latch 22 being in its latching position. This safety mechanism includes a flipper lever 52 that is disposed within the channel 19 at a point spaced below the actuating lever 43. The flipper lever 52 is pivotally supported relative to the door structure 13 by a pivot pin 53 and is movable from a released position as shown in the solid line view wherein a fork may freely pass it in the channel 19 and a safety position as indicated by the dotted line view 52-A. In a safety position 52-A, a fork that is positioned in the channel 19 above the flipper lever 52 cannot pass downwardly from this channel. Hence, in this position the operator will not be able to remove the forks from the channel 19 and, thus, an indication will be given to the operator that the latching mechanism is not engaged.

The flipper lever 52 is pivotally connected to an elongated link 54 by means of a pivot pin 55. The link 54 is pivotally connected to a trunnion 56 by means of a pivot pin 57 at its upper end. The trunnion 56 is adjustably connected to an elongated rod 58 that is slidably supported in the plate 25 and bracket 32. A coil spring 59 encircles the lower end of the rod 58 and bears against a washer 61 that is staked to the rod 58 and against the bracket 32. The spring 59 exerts an upward bias on the rod 58.

The rod 58 is connected by a trunnion 62 and pivot pin 63 at its upper end to an L-shaped link 64. The link 64 is supported at its bight by a pivot pin 65 that is carried at the outer end of the link 66. The link 66 is pivotally supported on the door 13 by a pivot pin 67. The outer end of the link 64 has a surface 68 that is engaged by a depending arm 69 of a bell crank 71. The bell crank 71 is supported on the roof 51 by means of a pivot pin 72 and its other leg 73 is juxtaposed to the latching pin 23.

When the latching pin 23 is in its engaged position as shown in FIG. 3, the bell crank 71 will be pivoted in a counterclockwise direction and will exert a downward bias on the link 64, rod 58 and link 54. This bias causes the flipper lever 52 to be held in the solid line or release position as shown in this figure.

In addition to the top latching mechanism 22, a side latching mechanism is provided at each edge of each door 13. The side latching mechanism at each side of each door 13 is the same in construction except that the mechanism at the left-hand side of the door is a mirror image of that at the right-hand side of the door. Because of this, only one side latching mechanism will be described in detail by particular reference to FIGS. 4 through 7, wherein the side latching mechanism is identified generally by the reference numeral 81.

The side latching mechanism 81 includes a pair of latching bars 82 and 83. The bar 82 is disposed at an acute angle to the pivot axis defined by the hinges 14 and is supported for sliding movement adjacent its ends by spaced bearing members 84 and 85 that are affixed in any suitable manner to the door 13. The latching bar 82 has an end portion 86 that is adapted to be received in a latching opening 87 of a socket member 88 (FIG. 5) that is affixed to an upstanding I-beam 89 of the car frame structure. When received in the socket opening 87, the latching bar 82 will hold the door 13 securely in a closed position.

The lower latching bar 83 is shorter than the upper latching bar 82 for a reason which will become more apparent as this description proceeds. The latching bar 83 extends substantially in a direction parallel to the axis defined by the hinges 14 and is supported adjacent its ends by bearing members 91 and 92 that are affixed in any suitable manner to the door 13. The latching bar 83 has an end portion 93 that is adapted to be received in a socket opening (not shown) that is also affixed to the I-beam 89 of the car frame for holding the door 13 in its closed position.

The latching bars 82 and 83 are moved between their latching and release positions by means of an operating mechanism including an operating link 94. The operating link 94 is pivotally connected at its upper end to a pair of links 95 and 96 by means of a pivot pin 97. The link 96 is pivotally supported at its other end upon the door structure 13 in any known manner by means including a pivot pin 98. The opposite end of the link 95 is pivotally connected to the latching bar 82 by means of a pivot pin 99.

In a like manner, the lower end of the operating bar 94 is pivotally connected to a pair of lower links 101 and 102 by means of a pivot pin 103. The opposite end of the link 102 is pivotally supported on the door 13 by means of a pivot pin 104. The opposite end of the link 101 is pivotally connected to the latching bar 83 by means of a pivot pin 105.

A bell crank 106 is pivotally supported on the outer face of the door by means of a pivot pin 107. One leg of the bell crank 106 is connected by means of a pivot pin 108 to an interconnecting link 110 and one end of the latter. The other end of the interconnecting link 110 is pivotally connected to the actuating link 94 by means of the pivot pin 108. The other leg of the bell crank 106 is pivotally connected to an operating handle 109 by means of a pivot pin 111. It will be noted that the pivot axis defined by the pivot pin 111 extends normally to the pivot axis defined by the pivot pin 108. When the side latching mechanism 81 is in its latching position, the handle 109 is adapted to be received in a keeper 112 that is affixed to the outer face of the door and is held in this stored position by a latch 113 that is supported upon a pivot pin 114. The latch 113 is pivotal between two extreme positions that are determined by stops 115 and 116.

In order to move the latching bars 82 and 83 from their latching positions to their released positions, the handle 109 is released by pivoting the latch 113 upwardly until it engages the stop 116. The handle 109 may then be rotated free of the keeper 112. At this time the handle 109 and bell crank 106 are rotated in a clockwise direction about the pivot pin 107 to move the operating link 94 in a generally upward direction as shown in the dotted line view of FIG. 4. As the operating link 94 moves upwardly, the pairs of links 95, 96 and 101, 102 pivot. This pivotal movement causes the latching bars 82 and 83 to be slid in their respective bearing members 84, 85 and 91, 92 to their released positions. When so released, the handle 109 will be juxtaposed to a protruding member 117 (FIG. 7) that is affixed to the outer face of the door 13 so that the handle 109 will extend outwardly from the door 13 and provide a visual indication that the side latching mechanism 81 is released.

To again latch the side latching mechanism 81, the operating handle 109 is rotated in the opposite direction to pull the operating bar 94 downwardly. This downward movement is continued until the links 96 and 102 engage stop bars 118 and 119, respectively, that are affixed to the door 13. At this time, the operating handle 109 may again be returned to its storage position in the keeper 112.

An interlock is provided that insures that the forks of the fork lift truck cannot be removed from the channels 19 and 21 until the side latching mechanisms 81 are engaged and which requires the release of the side latching mechanisms 81 before the release of the top latching mechanism 22. This interlock may be best understood by reference to FIG. 6.

The top latching bar 82, as has already been noted, is longer than the bottom latching bar 83. The latching bar 82 has sufficient length so that it will extend into the respective fork receiving channel 19 or 21 when it is in its released position. This end of the latching bar 82 is formed with a notch or cut-out 121. This cut-out receives the flipper lever 52 when the top latching mechanism 22 is released. In addition, this end of the latching bar 82 extends into the channel 19 when the side latching mechanism 81 is released so that the forks cannot be withdrawn from the channels until the side latching mechanism 81 at each side of the door 13 is latched.

Considering now the overall operation of the latching mechanism and assuming the doors 13 to be in their closed and fully latched positions, opening may be accomplished by inserting the specially shaped tines of a fork lift truck or similar element into the channels 19 and 21 from the bottom. These tines are raised until they reach the cam surface 46 of the operating lever 43 (FIG. 3). It will now be noted that the end of the latching bar 82 will not be disposed in the channels 19 and 21 as long as the side latching mechanisms 81 are in their latching positions. Once the forks reach the actuating lever 43, the side latching mechanisms 81 must be released.

If the side latching mechanisms 81 are not released prior to release of the top latching mechanism 22 the flipper lever 52 will interfere with the movement of the latching bar 82 into the channels 19. As may be readily seen from FIG. 3, the flipper lever 52 will be disposed within the channel 19 when the top latching mechanism 22 is released.

Once the forks are positioned adjacent the operating levers 83 in the channels 19 and 21, side latch mechanisms 81 are released in the manner described. Immediately upon release of the side latching mechanisms 81, the latching bar 82 will protrude into the channel 19 are preclude downward removal of the forks.

Once the side latching mechanisms are released the forks are raised to pivot the operating levers 43 and release the top latching mechanisms 22. The forks may then be moved laterally away from the side of the car 11 so that the door 13 can be swung to its loading position 13-A (FIG. 2). At this time, the forks may be withdrawn through the open tops of the channels 19 and 21 and the door 13 loaded in the manner already described.

When it is again desired to close the door 13, the forks are again inserted into the channels 19 and 21, this time at the top edge of the door 13. The forks are then raised and moved towards the car 11 to cause the door 13 to swing about the hinges 14 to its closed position. As the door swings closed, the upper latching pins 23 will engage the curved surfaces of the roof 51 and will be downwardly driven against the compression of the springs 27 and 28 until they reach the apertures 49. At this time, the pins 23 will be spring urged into their locked position assuming that the forks are not in contact with the actuating levers 43. At this time, the fork should be positioned below these levers in the channels 19 and 21. The forks will, however, still be above the inner end of the released latching bars 82 and these bars will interfere with continued downward movement of the forks. It will be noted that the positioning of the roof 51 precludes the removal of the forks through the top of the channels 19 and 21 when the door 13 is closed.

When the door 13 is closed and the top latching mechanism 22 engaged, the flippers 52 will be moved to the solid line position shown in FIG. 3 and it will then be possible to engage the side latching mechanism 81. It should be noted that the receipt of the flipper lever 52 in the cut-outs 121 of the top latching bars 82 will preclude engagement of the side latching mechanism 81 until the top latching mechanisms 22 are engaged. Thus, an operator will readily be cognizant of the fact that the top latching mechanism 22 is not engaged, if due to some malfunction this is the case.

Assuming that the top latching mechanisms 22 are engaged, the side latching mechanism 81 must also be latched in the manner previously described. When the side latching mechanisms 81 are latched and only when they are latched, the fork channels 19 and 21 will be clear and the fork may be removed. Thus, it should be readily apparent that assurance is given that all of the latching mechanisms are in their latching positions before the car 11 can be moved. The inability to move the forks from the channels 19 and 21 indicates that one or both of the side 81 and top 22 latching mechanisms are not engaged. An inability to engage the side latching mechanism 81 provides an indication that the top latching mechanisms 22 are not engaged.

It has already been noted that in some instances the weight of the motor vehicle 12 upon the hooks 15 and 16 may be sufficient to preclude disengagement. If a more positive means of assuring disengagement is desired, a manual locking mechanism, shown in FIGS. 8 and 9 may be provided.

Referring now to these figures, a pair of locking levers 151 and 152 are supported upon the door 13 for sliding and rotary movement by means of respective pairs of spaced bearings 153, 154 and 155, 156. The handles 151 and 152 have operating portions 157 and 158 at their outer ends and locking portions 159 and 161 at their inner ends.

Figure 9:
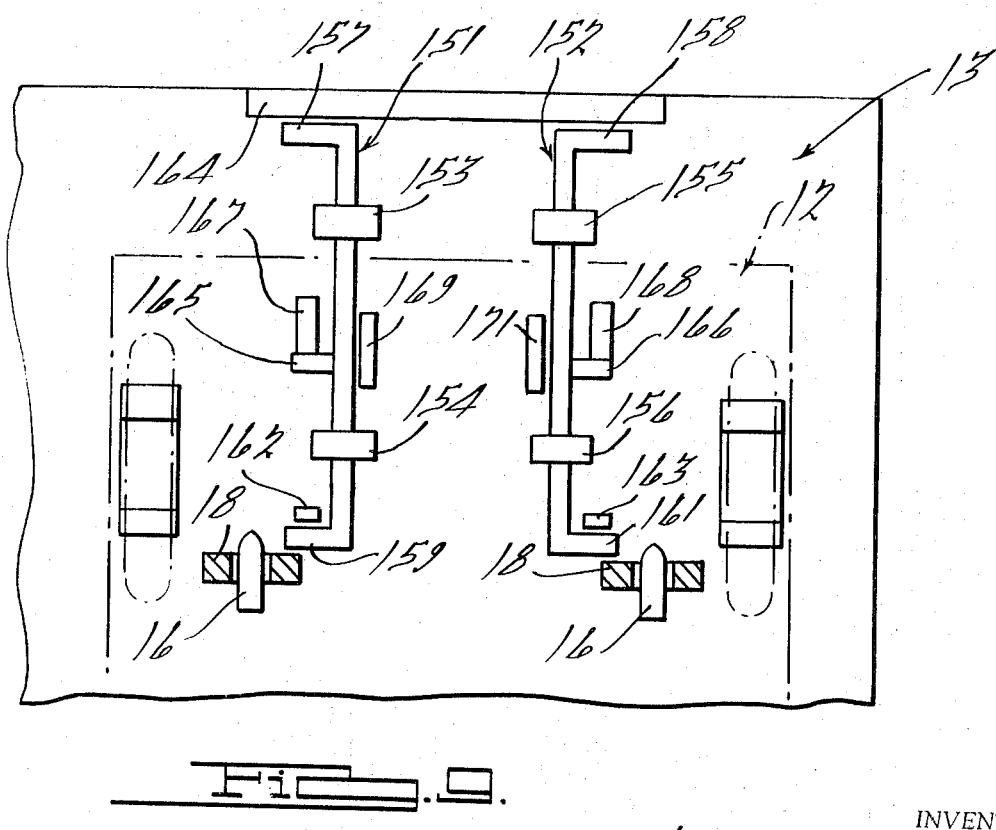
FIG. 9 is an enlarged view of the hold-down mechanism of FIG. 8 shown in its locked position.

FIG. 9 shows the locking handles 151 and 152 in their locking positions. In this position, the portions 159 and 161 overlie the frame brackets 18 sufficiently to preclude their disengagement from the hooks 16. Any vertical loading on the locking handles 151 and 152 is reduced by a pair of stop brackets 162 and 163 that are affixed to the door 13. In addition, the handle portions 157 and 158 may be disposed adjacent a transverse channel 164 of the door structure so as to absorb this vertical loading.

Lugs 165 and 166 are affixed to the handles 151 and 152 and are received on the inner side of stop blocks 167 and 168 of the door assembly 13 in their engaged positions. This engagement prevents accidental rotation of the handles 151 and 152 to their released positions. Stop blocks 169 and 171 are also juxtaposed to the lugs 165 and 166 and preclude 180° rotation of the operating handles 151 and 152 until the handles 151 and 152 are slid axially of the supporting bearings 153, 154 and 155, 156.

Figure 8:
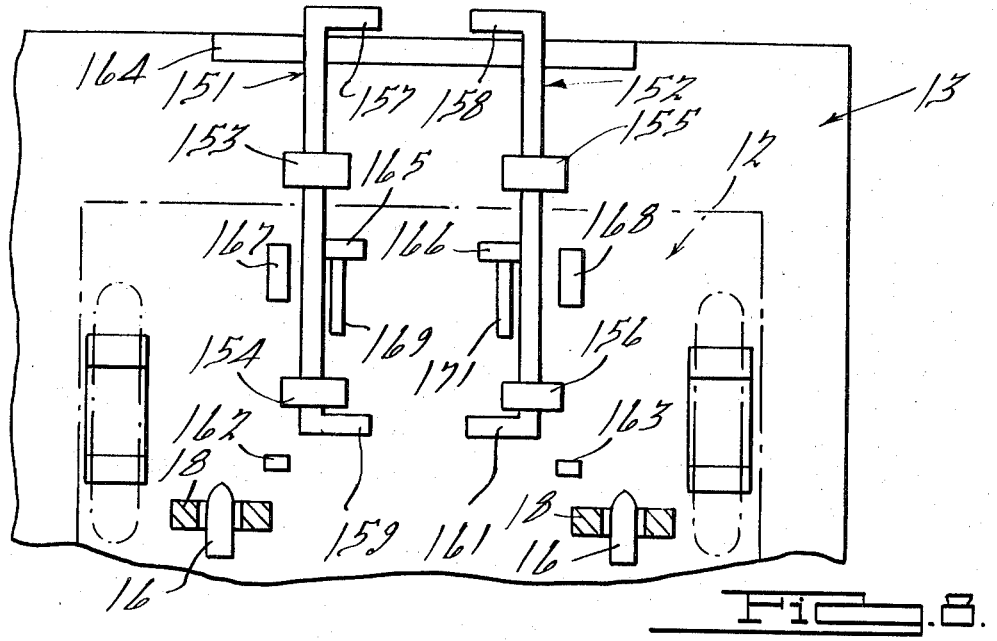
FIG. 8 is a top plane view of the load carrying door in an opened position and shows a manually operated cargo hold-down in its opened position.

Assuming that it is desired to unload the motor vehicle 12 from the door 13 and that the door 13 has already been opened, the handle portions 157 and 158 of the locking handles 15 and 152 must be grasped and rotated 90°. This 90° rotation moves the lugs 165 and 166 free of the stop blocks 167 and 168. At the same time, the locking portions 159 and 161 are moved free of the frame brackets 18 and of their respective stop brackets 162 and 163. The motor vehicle 12 cannot be driven off of the door 13 at this time, however, since the handle portions 157 and 158 protrude too far upwardly. The handles 151 and 152 must then be axially withdrawn and rotated through 90° to their release position as shown in FIG. 8. The motor vehicle 12 may then be driven off of the door 13. Now, in this position another motor vehicle may be driven onto the door 13 for loading.

It will be noted that in their released position (FIG. 8) the handles 151 and 152 protrude above the upper edge of the door 13. Thus, it will be impossible to close the door 13 until the locking handles 152 and 153 are in their locking positions. This insures that the hold-down mechanism will be engaged at all times during transit. In order to lock the hold-down mechanism, the handles 151 and 152 must be rotated through 90° so that the lugs 165 and 166 extend in a vertical direction. The handles are then moved axially until the lugs 165 and 166 pass the stop blocks 167 and 168. In this position, the handles 151 and 152 can only be rotated to their locked position (FIG. 9). When this is done, the vehicle 12 is locked securely in place on the door 13.

The hold-down shown in FIGS. 8 and 9, although manually operated, insures against accidental shipment of the motor vehicles 12 within the car 11 without being securely locked in place. In some instances, it may be desirable to insure an automatic locking of the hold-down mechanism and such an arrangement is shown in FIG. 10. In this embodiment, a hold-down mechanism that is automatically operated is shown in connection with one of the door-mounted hooks 16. It is to be understood that such a mechanism may be provided for each pair of hooks or for both pairs of hooks.

The hold-down mechanism includes a hold-down lever 201 that is pivotally supported on a bracket 202 by a pivot pin 203. The bracket is affixed in any suitable manner to the door structure 13. An actuating link 204 is pivotally connected at one of its ends to the hold-down lever 201, by means of a pivot pin 205. The other end of the actuating link 204 is pivotally connected to the car 11 by means of a pivot pin 206. The pivot pin 205 defines a pivot axis that is offset from the pivot axis defined by the hinges 14, indicated schematically at 207. The link 204 passes through a slot 208 in a Z-shaped structural member 209 that is affixed to the door 13 and which pivots about the pivot axis 207.

FIG. 10 shows the automatic hold-down structure as it appears when the door 13 is closed in the solid line portion of this figure. In this position, the hold-down lever 201 bears against the frame bracket 18 and precludes its disengagement from the hook 16. When the door 13 is swung towards its open position about the pivot axis 207, the actuating link 204 will move in the same general, i.e., clockwise direction. However, these members pivot about different pivot axes. As has already been noted, the pivot pin 206 of the link 204 is disposed downwardly and outwardly of the pivot axis 207 of the door 13. Hence, the actuating link 204 will tend to slide upwardly relative to the door structure 13 as the latter is opened. This will put a force on the hold-down link 201 that rotates it in a counterclockwise direction about its supporting pivot pin 202. This movement continues until the lever 201 is free of its position behind the frame bracket 18. At this stage, the hold-down is released and the motor vehicle 12 may be driven from the door 13. It should be readily apparent that upon closure of the door 13, the hold-down lever 201 will again pivot to its latched position as shown in FIG. 10.

What is claimed is:

1. In a freight carrying device comprising a load carrying member adapted to support a load, means supporting said load carrying member for movement between a loading position and a load supporting position, first latching means for locking said load carrying member in its load supporting position, said first latching means being movable between a latching position and a released position, means in said load carrying member defining a channel adapted to receive an operator for moving said first latching means between its positions, second latching means for locking said load carrying member in its load supporting position, said second latching means being movable between a latching position and a released position, means for moving said second latching means between its positions, and means operatively connected to each of said latching means for precluding removal of the operator from said channel until both of said latching means are in their latched positions and for precluding movement of one of said latching means from its released position to its latched position until the other of said latching means is moved from its released position to its latched position.

2. A freight carrying device as set forth in claim 1 wherein the last named means includes a blocking member adapted to extend across the channel, means connecting said blocking member to the first latching means for moving the blocking member to a blocking position within the channel when said first latching means is in its released position.

3. A freight carrying device as set forth in claim 2 wherein the last named means further includes a second blocking member movable to a blocking position within the channel and means interconnecting said second blocking member to the second latching means for moving said second blocking member to its blocking position within the channel when said second latching means is in its released position.

4. A freight carrying device as set forth in claim 3 wherein the means for precluding movement of one of the latching means from its released position to its latched position comprises interengaging means on the first and second blocking members.

5. A freight carrying device as set forth in claim 1 wherein the device comprises a railway car, the load carrying member comprising a door for said car, said door being supported for its movement between its positions about a horizontally disposed axis and forming a ramp when in its loading position onto which a motor vehicle may be driven.

6. A freight carrying device as set forth in claim 1 wherein the first latching means comprises a latching pin supported for reciprocation and further includes an operating lever supported for pivotal movement within the channel and adapted to be engaged by the fork of a lift truck or the like for pivoting said actuating lever and moving said latching pin between its latching positions and its released position, the last named means including a first blocking member supported for pivotal movement within said channel at a point axially spaced from said actuating lever and operatively connected to said latching pin for retaining a fork within said channel when in a blocking position, the second latching means comprising a slidably supported latching bar, said latching bar having a portion adapted to be received in said channel when said latching bar is in its released position for retaining the fork within said channel, said latching bar portion having a cut-out therein for receiving said blocking member to preclude movement of said latching bar to its latched position until said latching pin is in its latching position.

7. A closure construction comprised of a closure member, means supporting said closure member for pivotal movement about a pivot axis between an opened position and a closed position, first latching means at the edge of said closure member remote from its pivot axis, said first latching means being movable between a latched position and a released position, second latching means at an edge of said closure member angularly disposed relative to the first mentioned edge, said second latching means being movable between a latched position and a released position, means defining an opening in said closure member for receiving an operator for moving one of said latching means between its positions, means for moving the other of said latching means between its positions, means for precluding the removal of an operator from said opening until said other latching means is in its latched position, and means for precluding movement of said other latching means to its latched position until said first latching means is moved to its latched position.

8. A closure construction as set forth in claim 7 wherein the last named means further includes means for precluding removal of the operator from the opening until both of the latching means are in their latched positions.

9. A closure structure as set forth in claim 7 wherein the closure member comprises a door and wherein the pivot axis is a horizontally disposed axis.

10. A closure construction as set forth in claim 7 further including hook means affixed to the closure member for carrying objects thereupon.

11. A closure construction as set forth in claim 10 wherein the closure member comprises a door, the pivot axis being horizontally disposed whereby the door forms a ramp in its opened position for driving of motor vehicles thereupon for support by the hooks.

12. A closure construction as set forth in claim 11 further including hold-down means cooperating with the hook means and the motor vehicles for retaining the motor vehicles upon the closure member, said hold-down means being movable between an engaged position and a disengaged position, and means for moving said hold-down means between its positions in response to movement of said closure member between its positions.

13. A closure construction as set forth in claim 11 further including hold-down means cooperating with the hook means and the motor vehicles for retaining the motor vehicles upon the closure member, said hold-down means being movable between an engaged position and a disengaged position, operating means for moving said hold-down means between its positions, said operating means including means for precluding movement of said closure member to its closed position when said hold-down means is in its disengaged position.

14. A closure construction as set forth in claim 7 wherein the pivot axis of the closure member is horizontally disposed and is at the lower edge of said closure member when said closure member is in its closed position.

15. A closure construction as set forth in claim 14 further including means for precluding movement of the other latching means to its latched position until the first mentioned latching means is moved to its latched position.

* * * * *